(12) United States Patent
Chen et al.

(10) Patent No.: US 8,625,556 B2
(45) Date of Patent: Jan. 7, 2014

(54) SIGNAL INTERFERENCE HANDLING METHOD AND SYSTEM AND APPARATUS USING THE SAME

(75) Inventors: Yung-Han Chen, Hsinchu (TW); Yan-Xiu Zheng, Taipei County (TW); Chun-Yuan Chiu, Pingtung County (TW)

(73) Assignee: Acer Incorporated, New Taipei (TW)

( * ) Notice: Subject to any disclaimer, the term of this patent is extended or adjusted under 35 U.S.C. 154(b) by 233 days.

(21) Appl. No.: 12/968,284

(22) Filed: Dec. 15, 2010

(65) Prior Publication Data

US 2011/0158168 A1    Jun. 30, 2011

Related U.S. Application Data

(60) Provisional application No. 61/290,762, filed on Dec. 29, 2009.

(30) Foreign Application Priority Data

Nov. 18, 2010    (TW) ................................ 99139731 A (51) Int. Cl.
*H04W 4/00*    (2009.01)
*H04W 84/12*    (2009.01)

(52) U.S. Cl.
CPC ..................................... *H04W 84/12* (2013.01)
USPC .......................................... 370/338; 370/315

(58) Field of Classification Search
USPC .................. 370/312–315, 328–338; 455/411, 455/414.2, 414.3, 422.1, 440, 444, 458
See application file for complete search history.

(56) References Cited

U.S. PATENT DOCUMENTS

| | | | |
|---|---|---|---|
| 7,079,812 | B2 | 7/2006 | Miller et al. |
| 2007/0202867 | A1 | 8/2007 | Waltho et al. |
| 2009/0147084 | A1 | 6/2009 | Kajino et al. |
| 2009/0197631 | A1 | 8/2009 | Palanki et al. |
| 2010/0008294 | A1 | 1/2010 | Palanki et al. |
| 2010/0075654 | A1 | 3/2010 | Cheng |

(Continued)

FOREIGN PATENT DOCUMENTS

| | | |
|---|---|---|
| TW | 200729804 | 8/2007 |
| TW | 200948110 | 11/2009 |

(Continued)

OTHER PUBLICATIONS

Ying Li et al., "Interference mitigation to support overlaid CSG-closed femto ABS", Internet Citation, Nov. 18, 2009, XP007917424, Retrieved from the Internet: URL: http://wirelessman.org/tgm/contrib/C80216m-09_2596r2.pdf, p. 1-p. 16.

(Continued)

*Primary Examiner* — Kan Yuen
(74) *Attorney, Agent, or Firm* — Jianq Chyun IP Office (57) ABSTRACT

A signal interference handling method adapted to a cellular system, and a system and an apparatuses using the same are provided, where the cellar system includes a macro/micro cell base station (MBS), a home base station (HBS), and a MBS-served mobile station (m-MS), and the signal interference handling method includes steps. The m-MS detects whether there is mutual interference. The m-MS sends an interference mitigation (IM) request to the HBS if there is mutual interference. The HBS enters a low duty mode (LDM) after the HBS receives the IM request.

26 Claims, 11 Drawing Sheets

(56) References Cited

U.S. PATENT DOCUMENTS

| | | | |
|---|---|---|---|
| 2010/0173661 A1* | 7/2010 | Miyazaki et al. | 455/507 |
| 2010/0177695 A1* | 7/2010 | Ji et al. | 370/328 |
| 2010/0316003 A1* | 12/2010 | Sukiasyan et al. | 370/329 |
| 2010/0323610 A1* | 12/2010 | Li et al. | 455/3.01 |
| 2011/0003591 A1* | 1/2011 | Venkatachalam et al. | 455/434 |
| 2011/0086651 A1* | 4/2011 | Li et al. | 455/501 |

FOREIGN PATENT DOCUMENTS

| | | |
|---|---|---|
| TW | 201018334 | 2/2010 |
| TW | 201014409 | 4/2010 |
| WO | 2010/079999 | 7/2010 |

OTHER PUBLICATIONS

Jungje Son et al., "Message format of AMS measurement configuration and report for Self-organizing network", Internet Citation, Aug. 31, 2009, XP002627292, Retrieved from the Internet: URL:wirelessman.org/tgm/contrib/C80216m-09__1871.doc, p. 1-p. 18.

Chien-Chun Hsu et al., "Proposed Text on the Femto Low-Duty Mode Operation", Internet Citation, Nov. 17, 2009, XP002627331, Retrieved from the Internet: URL:wirelessman.org/tgm/contrib/C80216m-09__2302r2.doc, p. 1-p. 4.

Yung-Han Chen et al., "SFH Forwarding by a CSG Femto ABS for Interference Control", Internet Citation, Dec. 31, 2009, XP002627326, Retrieved from the Internet: URL:wirelessman.org/tgm/contrib/C80216m-09__2979.doc, p. 1-p. 3.

Soumaya Hamouda et al., "Dynamic hard Fractional Frequency Reuse for mobile WiMAX", Pervasive Computing and Communications, 2009. PERCOM 2009. IEEE International Conference on, IEEE, Piscataway, NJ, USA, Mar. 9, 2009, XP031453207, p. 1-p. 6.

Chang-Lan Tsai et al., "Interference Mitigation for 802.16m", Internet Citation, Jul. 16, 2008, XP007917440, Retrieved from the Internet: URL:wirelessman.org/tgm/contrib/C80216m-08__583r1.pdf. p. 1-p. 5.

"Search Report of European counterpart application No. 10197250.3", issued on Mar. 22, 2011, p. 1-p. 13.

"Search Report of European counterpart application No. 10197248.7", issued on Mar. 17, 2011, p. 1-p. 11.

LAN/MAN Standards Committee of the IEEE Computer Society and the IEEE Microwave Theory and Techniques Society, "DRAFT Amendment to IEEE Standard for Local and metropolitan area networks Part 16: Air Interface for Fixed and Mobile Broadband Wireless Access Systems," IEEE P802.16m/D3, Dec. 2009, pp. 1-674.

"First Office Action of Europe Counterpart Application", issued on Feb. 18, 2013, p. 1-p. 11.

* cited by examiner

SIGNAL INTERFERENCE HANDLING METHOD AND SYSTEM AND APPARATUS USING THE SAME

CROSS-REFERENCE TO RELATED APPLICATION

This application claims the priority benefits of U.S. provisional application Ser. No. 61/290,762, filed on Dec. 29, 2009 and Taiwan application serial no. 99139731, filed on Nov. 18, 2010. The entirety of each of the above-mentioned patent applications is hereby incorporated by reference herein and made a part of this specification.

BACKGROUND

1. Field of the Disclosure

The disclosure relates to a signal interference handling method. Particularly, the disclosure relates to a signal interference handling method for handling interference of a home base station (HBS) to a macro/micro cell base station (MBS)-served mobile station (MS) (m-MS), and a system, a HBS and a MS using the same.

2. Description of Related Art

Development of a cellular system has gradually become mature, and presently not only a macro/micro cell base station (MBS) could serve a mobile station (MS), but a home base station (HBS) could also be established within a coverage range of the MBS to serve the MS. The HBS is, for example, a femtocell base station, and a coverage range thereof is partially overlapped with the coverage range of the MBS.

The HBS could be a limited access base station, for example, a closed subscriber group home base station (CSG HBS), which does not allow accessing of the MS of a non-registered or non-member user. When the MBS-served MS (m-MS) approaches the HBS, MBS control signal (coming from the MBS) received by the m-MS could be severely interfered by HBS control signal (coming from the HBS), where the HBS control signal is used to control the MS of its subscriber, and is not used to control the m-MS. Therefore, the HBS control signal is a source of interference of the MBS control signal received by the m-MS.

SUMMARY OF THE DISCLOSURE

An exemplary embodiment of the disclosure provides a signal interference handling method, and a system, a home base station (HBS) and a mobile station (MS) using the same. The signal interference handling method is adapted to a cellular system, where the cellular system includes a macro/micro cell base station (MBS), a HBS, and a MBS-served mobile station (m-MS), where the MBS includes a relay station within an extending signal range thereof, and the signal interference handling method includes following steps. The m-MS detects whether there is mutual interference. The m-MS sends an interference mitigation (IM) request to the HBS when there is mutual interference. The HBS enters a low duty mode (LDM) after the HBS receives the IM request.

An exemplary embodiment of the disclosure provides a signal interference handling method, which is adapted to a m-MS of a cellular system, and the signal interference handling method includes following steps. The m-MS receives MBS signal, where the MBS signal comes from a MBS of the cellular system. The m-MS determines whether there is mutual interference according to the received MBS signal. The m-MS sends an IM request to a HBS of the cellular system when there is mutual interference.

An exemplary embodiment of the disclosure provides a signal interference handling method, which is adapted to a HBS of a cellular system, and the signal interference handling method includes following steps. After the HBS receives an IM request, the HBS enters a LDM, where the IM request is sent by a m-MS of the cellular system when the m-MS detects mutual interference.

An exemplary embodiment of the disclosure provides a signal interference handling method, which is adapted to a HBS of a cellular system, and the signal interference handling method includes following steps. After the HBS receives an IM request, the HBS communicates with a MBS of the cellular system, and sets transmission power and a fractional frequency reuse (FFR) duration of a frequency partition of HBS signal in a FFR setting, where the IM request is sent by a m-MS of the cellular system when the m-MS detects mutual interference, and the HBS operates at a communicated frequency partition during the FFR duration.

An exemplary embodiment of the disclosure provides a signal interference handling method, which is adapted to a HBS of a cellular system, and the signal interference handling method includes following steps. After the HBS receives an IM request, the HBS sends a MBS signal request to a MBS of the cellular system, where the IM request is sent by a m-MS of the cellular system when the m-MS detects mutual interference. After the HBS sends the MBS signal request, the HBS receives MBS signal from the MBS. The HBS transmits HBS signal and the MBS signal to the m-MS in a multiplexing transmission mode.

An exemplary embodiment of the disclosure provides a cellular wireless communication system, which is adapted to handle signal interference. The cellular wireless communication system includes a macro/micro cell base station (MBS), a home base station (HBS) and a MBS-served mobile station (m-MS). The m-MS detects whether there is mutual interference, and the m-MS sends an interference mitigation (IM) request to the HBS when there is mutual interference. The HBS enters a low duty mode (LDM) after the HBS receives the IM request.

An exemplary embodiment of the disclosure provides a mobile station (MS), which is adapted to handle signal interference. The MS receives macro/micro cell base station (MBS) signal, where the MBS signal comes from a MBS. The MS determines whether there is mutual interference according to the received MBS signal. The MS sends an interference mitigation (IM) request to a home base station (HBS) when there is mutual interference.

An exemplary embodiment of the disclosure provides a home base station (HBS), which is adapted to handle signal interference. After the HBS receives an interference mitigation (IM) request, the HBS enters a low duty mode (LDM), where the IM request is sent by a macro/micro cell base station (MBS)-served mobile station (m-MS) when the m-MS detects an interference.

An exemplary embodiment of the disclosure provides a home base station (HBS), which is adapted to handle signal interference. After the HBS receives an interference mitigation (IM) request, the HBS communicates with a macro/micro cell base station (MBS), and sets transmission power and a fractional frequency reuse (FFR) duration of a frequency partition of HBS in a FFR setting, where the IM request is sent by a MBS-served mobile station (m-MS) when the m-MS detects mutual interference, and the HBS operates at a communicated frequency partition during the FFR duration.

An exemplary embodiment of the disclosure provides a home base station (HBS), which is adapted to handle signal interference. After the HBS receives an interference mitigation (IM) request, the HBS sends a macro/micro cell base station (MBS) signal request to a MBS, where the IM request is sent by a MBS-served mobile station (m-MS) when the m-MS detects mutual interference. After the HBS sends the MBS signal request, the HBS receives MBS signal from the MBS. The HBS transmits HBS signal and the MBS signal to the m-MS in a multiplexing transmission mode.

According to the above descriptions, the exemplary embodiments of the disclosure provide a plurality of the signal interference handling methods for mitigating or handling the interference of the HBS signal to the MBS signal, and a system, a HBS and a MS using the same. According to the signal interference handling methods, the m-MS closed to the HBS could correct receive the MBS signal.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
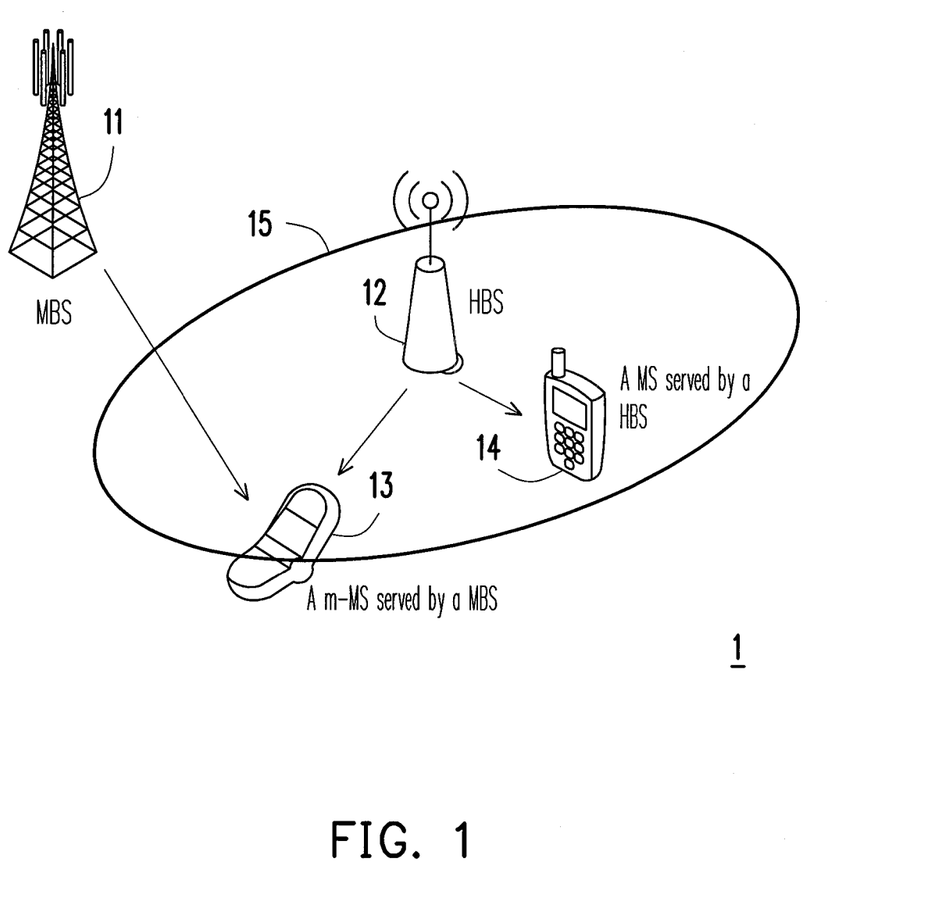
FIG. 1 is a schematic diagram illustrating a cellular system according to an exemplary embodiment of the disclosure.

Firstly, referring to FIG. 1, FIG. 1 is a schematic diagram illustrating a cellular system according to an exemplary embodiment of the disclosure. The cellular system 1 includes a macro/micro cell base station (MBS) 11, a home base station (HBS) 12, a MBS-served mobile station (m-MS) 13 (served by the MBS 11) and a MS 14 (served by the HBS 12), where the HBS 12 is, for example, a closed subscriber group home base station (CSG HBS) or a femtocell base station, and a coverage range 15 of the HBS 12 is partially overlapped to a coverage range of the MBS 11. When the m-MS 13 approaches to the HBS 12, MBS signal (comes from the MBS 11) received by the m-MS 13 is probably interfered by HBS signal (corning from the HBS 12). The MBS signal and the HBS signal could be control signals or data signals of the system. Therefore, exemplary embodiments of the disclosure provide a plurality of signal interference handling methods for mitigating or handling the interference of the HBS signal to the MBS signal, so that the m-MS 13 could correctly receive the MBS signal.

Figure 2:
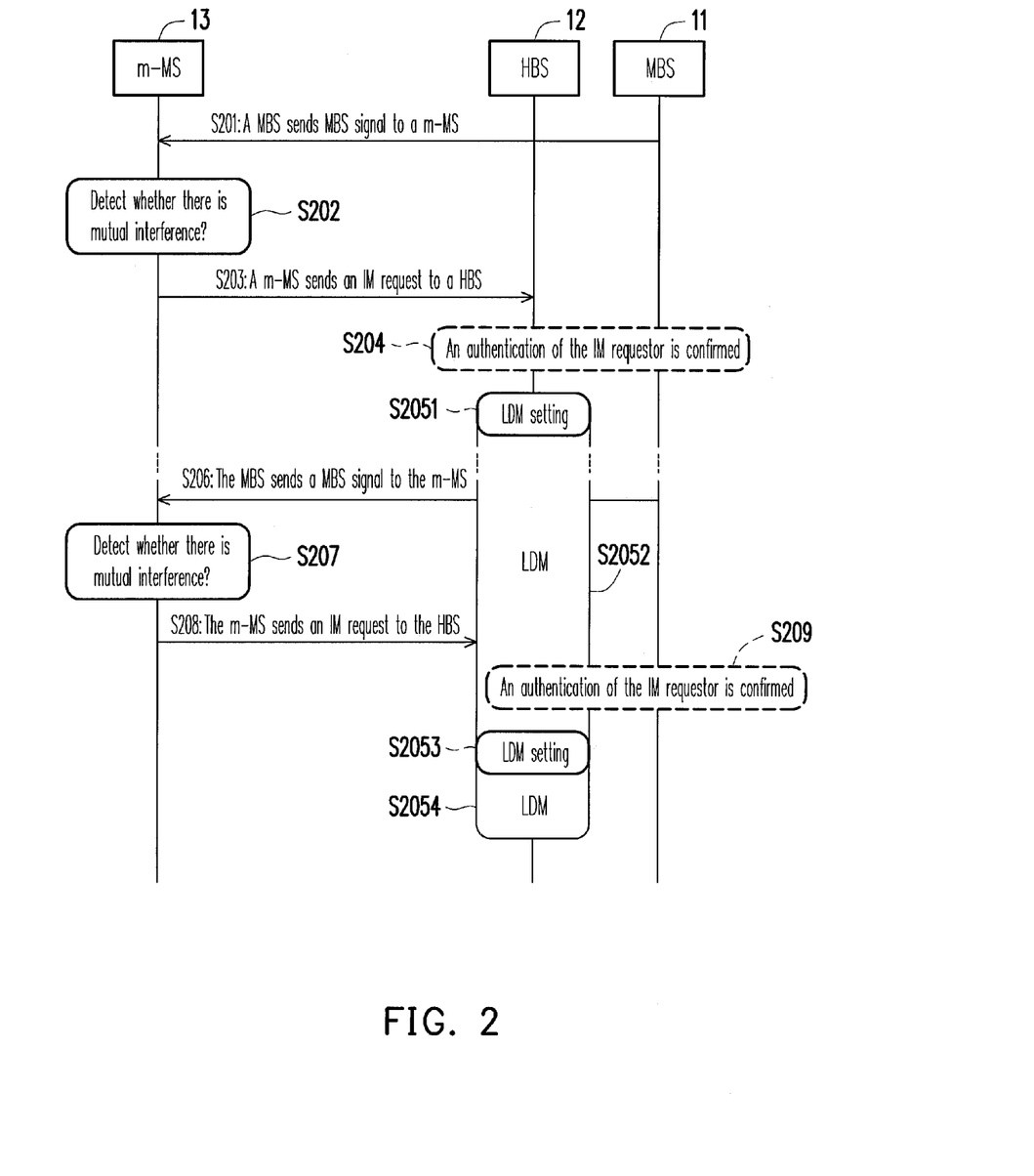
FIG. 2 is a flowchart illustrating a signal interference handling method according to an exemplary embodiment of the disclosure.

Referring to FIG. 2, FIG. 2 is a flowchart illustrating a signal interference handling method according to an exemplary embodiment of the disclosure, in which the steps marked by dot lines are non-necessary steps. In step S201, the MBS 11 sends a MBS signal to the m-MS 13. In the present exemplary embodiment, the MBS signal is a system control signal. Then, in step S202, the m-MS 13 detects whether there is mutual interference according to the received MBS signal. When the m-MS 13 approaches to the HBS 12, the MBS signal could be severely interfered by the HBS signal, so that the MBS signal received by the m-MS 13 could be incorrect. Therefore, the m-MS 13 could determine whether there is mutual interference by decoding, demodulating the received MBS signal or estimating a signal to interference and noise ratio (SINR).

In the exemplary embodiment of FIG. 2, it is assumed that the m-MS 13 detects the mutual interference, so that in step S203, the m-MS 13 sends an interference mitigation (IM) request to the HBS 12. After the HBS 12 receives the IM request, the HBS 12 directly enters a low duty mode (LDM), where a LDM duration and an activating-deactivating pattern of a LDM setting are predetermined LDM duration and activating-deactivating pattern. The LDM duration is an operation duration of the LDM, and the LDM activating-deactivating pattern represents an interlaced distribution of activating periods and deactivating periods in the LDM duration. If the LDM duration is set unlimited or there is no restriction on the LDM duration, it means that the HBS 12 will operate in the LDM continually until receiving any event, signalling or command to stop the LDM.

Another possible implementation is that after the HBS 12 receives the IM request, the HBS 12 first determines whether there is any serving mobile station (MS) within the coverage range of the HBS 12, and if there is no serving MS, and there is no MS performing network entry or network re-entry within the coverage range of the HBS 12, the HBS 12 enters the LDM.

However, in order to avoid a situation that a malicious m-MS sends the IM request to the HBS 12, in the exemplary embodiment of FIG. 2, before the HBS 12 enters the LDM, a step S204 is executed, though the step S204 is not a necessary step. In the step S204, the HBS 12 confirms an authentication of the IM requestor (i.e. the m-MS 13) from the MBS 11, and only when the HBS 12 successfully confirms the authentication of the IM requestor, a step S2051 is executed. In the step S2051, the HBS 12 sets the LDM duration and the activating-deactivating pattern of the LDM setting. Generally, the LDM setting is a predetermined LDM setting (i.e., the predetermined LDM duration and activating-deactivating pattern are used).

In step S2052, the HBS 12 enters the LDM, and during the activating period of the LDM duration, the HBS 12 is operated in a normal mode, and during the deactivating period of the LDM duration, the HBS 12 and the member MS of the HBS 12 within the coverage range thereof are forbidden to receive signal from a wireless channel and transmit signal to the wireless channel. However, the MBS 11 may continually transmit the MBS signal to the m-MS 13. For example, in step S206, the MBS 11 transmits another MBS signal to the m-MS 13. Then, in step S207, the m-MS 13 detects whether there is mutual interference. In this exemplary embodiment, it is assumed that there is mutual interference, so that a step S208 is executed.

In the step S208, the m-MS 13 sends the IM request to the HBS 12. Similarly, in order to avoid the situation that the malicious m-MS sends the IM request to the HBS 12, in the exemplary embodiment of FIG. 2, before the HBS 12 executes the step S2053, a step S209 is firstly executed, though the step S209 is not a necessary step. In the step S209, the HBS 12 confirms the authentication of the IM requestor (i.e., the m-MS 13) from the MBS 11, and only when the HBS 12 successfully confirms the authentication of the IM requestor, the step S2053 is executed. In the step S2053, the HBS 12 determines whether the LDM setting is required to be adjusted, and if the LDM is required to be adjusted, the HBS 12 reconfigures the LDM duration and the activating-deactivating pattern of the LDM setting. Then, in step S2054, the HBS 12 is continually operated in the LDM.

It should be noticed that each time when the LDM setting is adjusted, the HBS 12 could also transmit response signal to the member MS of the HBS 12 within the coverage range thereof, so that the member MS of the HBS 12 within the coverage range thereof could obtain the interlaced distribution of the activating periods and the deactivating periods in the LDM duration. Moreover, the LDM described in the exemplary embodiment of the disclosure could be a LDM of an IEEE 802.16 system, though the LDM is not limited to the LDM of the IEEE 802.16 system. In other wireless communication standards, although a name of the LDM could be different, as long as an actual effect thereof is the same, it is considered to be within the scope of the disclosure.

The cellular system 1 is, for example, an IEEE 802.16m system, and the IM request is an advanced air interface ranging request (AAI-RNG-REQ) with an indication of femto interference mitigation. In another exemplary embodiment, the HBS 12 enters the LDM only when there is no serving MS within its coverage range and there is no MS performing network entry or network re-entry within its coverage range.

Moreover, when the cellular system 1 is the IEEE 802.16m system, the aforementioned activating period is a service available interval (AI), and the deactivating period is a service unavailable interval (UAI). When the HBS 12 enters the LDM, the HBS 12 is operated in the normal mode during the AI, and the HBS 12 does not transmit any signal to the air interface during the UAI. The HBS 12 transmits an advanced air interface registration response (AAI-REG-RSP) to the member MS of the HBS 12 within the coverage range thereof, so that the member MS of the HBS 12 within the coverage range thereof could obtain the interlaced distribution of the AI and the UAI in the LDM duration. In other words, the AAI-REG-RSP is a message carrying LDM parameter configuration information.

Figure 3:
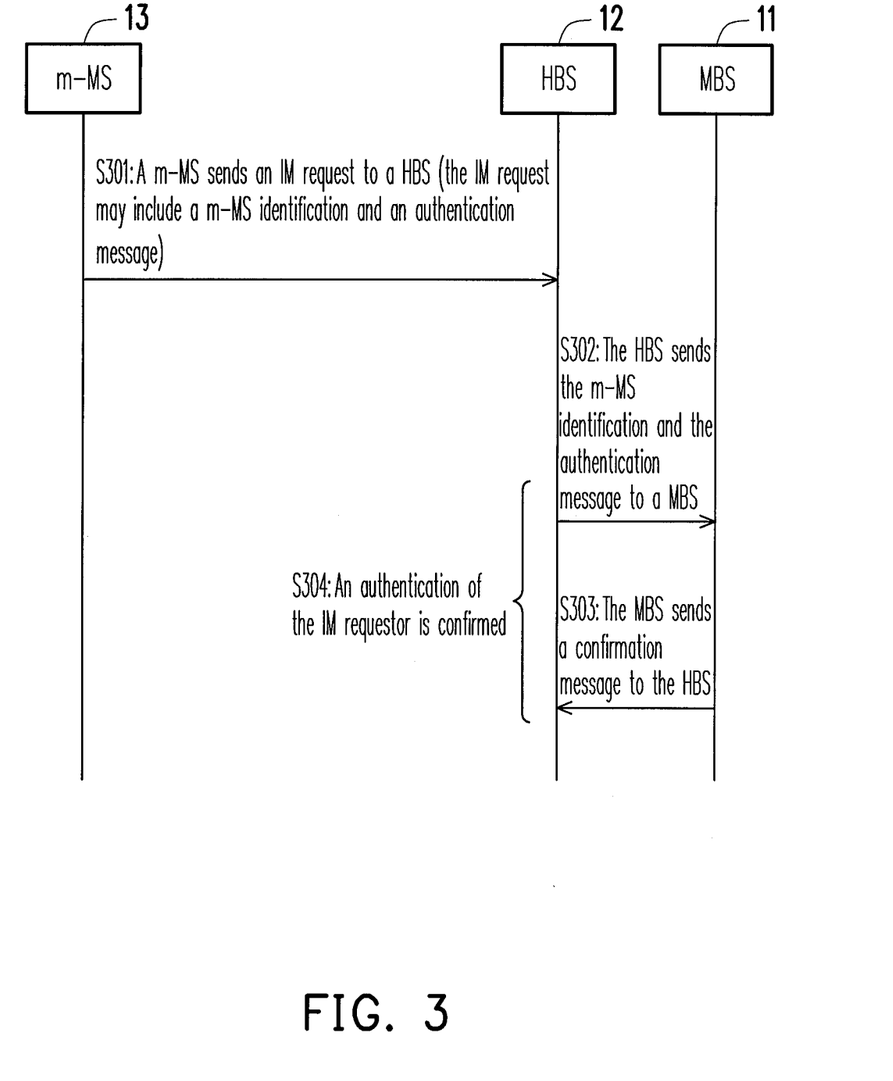
FIG. 3 is a flowchart illustrating a method for confirming authentication of an interference mitigation (IM) requestor according to an exemplary embodiment of the disclosure.

Referring to FIG. 3, FIG. 3 is a flowchart illustrating a method for confirming an authentication of the IM requestor according to an exemplary embodiment of the disclosure. In step S301, when the m-MS 13 detects the interference, the m-MS 13 sends the IM request to the HBS 12, and the IM request may include a m-MS identification and an authentication message. In another exemplary embodiment, the HBS 12 may request the m-MS identification and the authentication message from the m-MS 13 after receiving the IM request.

The step S304 includes a step S302 and a step S303. In the step S302, the HBS 12 sends the m-MS identification and the authentication message to the MBS 11. If the MBS 11 determines that the m-MS 13 is a legitimate user according to the m-MS identification and the authentication message, the step S303 is executed. If the MBS 11 determines that the m-MS 13 is an illegitimate user according to the m-MS identification and the authentication message, the MBS 11 sends a rejection message to the HBS 12. In the present exemplary embodiment, it is assumed that the MBS 11 determines that the m-MS 13 is a legitimate user according to the m-MS identification and the authentication message. Therefore, in the step S303, the MBS 11 sends a confirmation message to the HBS 12, so that the HBS 12 could successfully confirm the authentication of the IM requestor.

Figure 4:
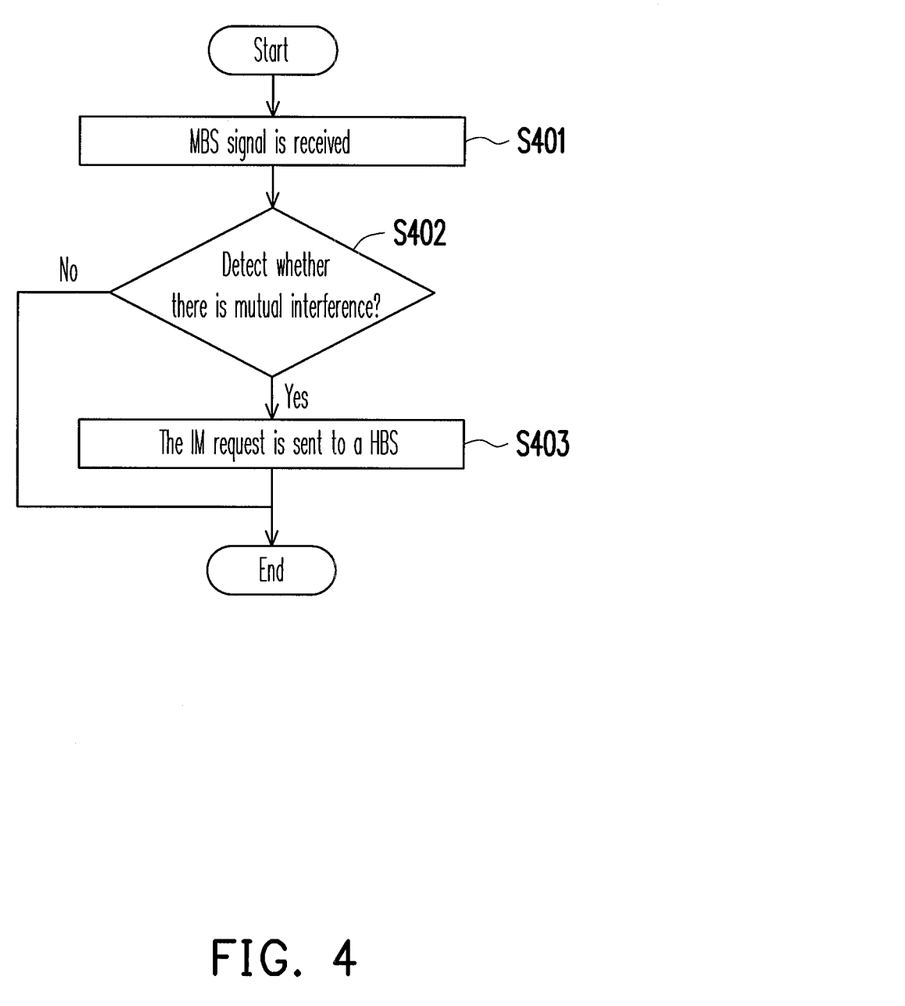
FIG. 4 is a flowchart of a signal interference handling method provided by an exemplary embodiment of the disclosure executed on a macro/micro cell base station (MBS)-served mobile station (m-MS).

Referring to FIG. 4, FIG. 4 is a flowchart of the signal interference handling method provided by the exemplary embodiment of the disclosure executed on the m-MS. In step S401, the m-MS 13 receives the MBS signal. Then, in step S402, the m-MS 13 detects whether there is mutual interference. If the m-MS 13 does not detect the mutual interference, the signal interference handling method is ended, and if the m-MS 13 detects the mutual interference, a step S403 is executed. In the step S403, the m-MS 13 sends the IM request to the HBS 12. As described above, the IM request may include the m-MS identification and the authentication message. In the IEEE 802.16 system, the IM request is represented by an indication of femto interference mitigation.

Figure 5:
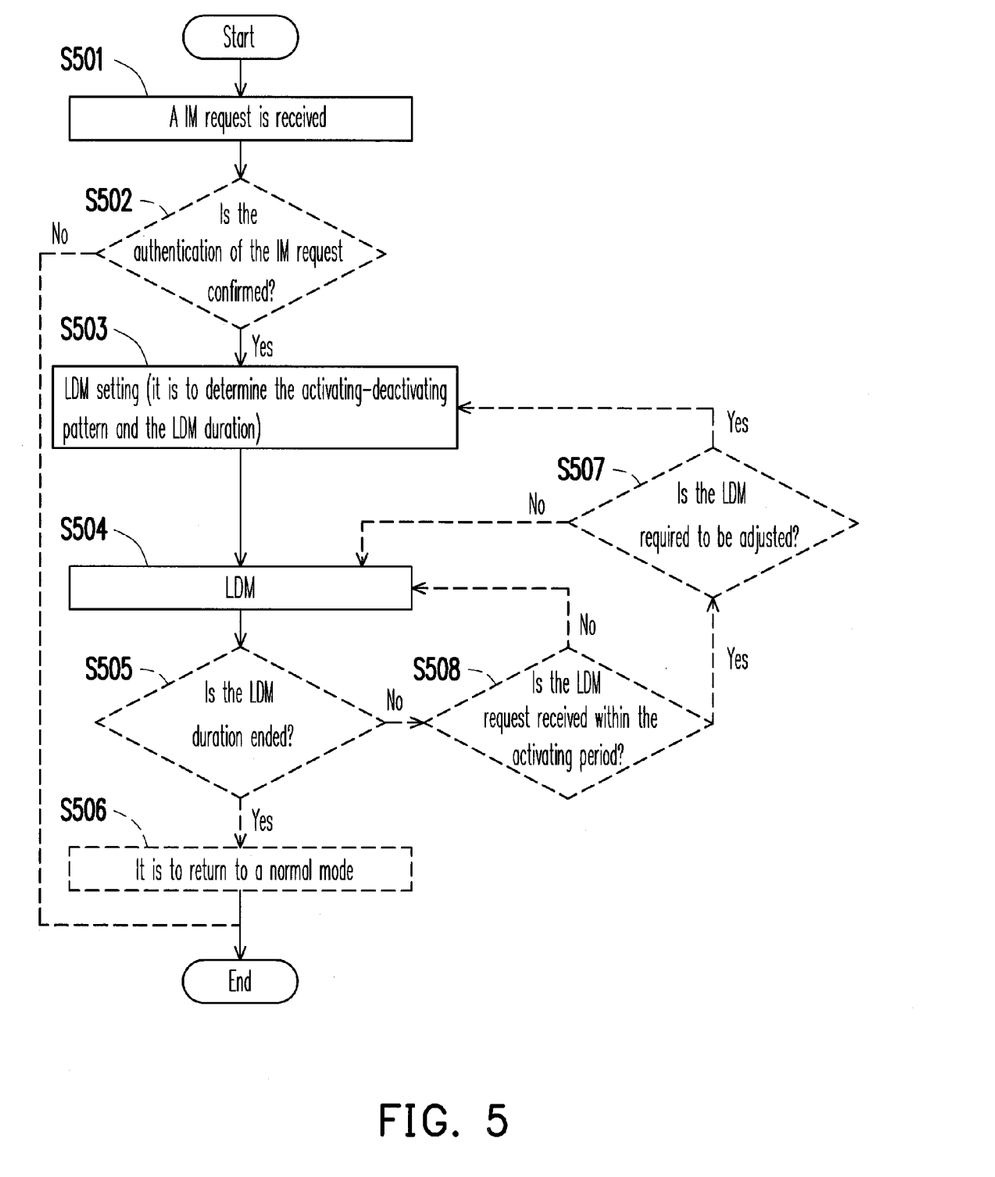
FIG. 5 is a flowchart of a signal interference handling method provided by an exemplary embodiment of the disclosure executed on a home base station (HBS).

Referring to FIG. 5, FIG. 5 is a flowchart of the signal interference handling method provided by the exemplary embodiment of the disclosure executed on the HBS, in which the steps marked by dot lines are non-necessary steps, and if the non-necessary determination-type steps are not executed, determination results thereof could be determined according to system predetermined values. First, in step S501, the HBS 12 receives the IM request. Then, in step S502, the HBS 12 determines whether or not to confirm an authentication of the IM requestor. If the HBS 12 successfully confirms the authentication of the IM requestor, a step S503 is executed, and if the HBS 12 does not successfully confirm the authentication of the IM requestor, the whole signal interference handling method is ended. As described above, the step S502 is executed to avoid a situation that a malicious m-MS sends the IM request, and the step S502 could be removed from the signal interference handling method.

In the step S503, the LDM duration and the activating-deactivating pattern in the LDM setting are set. After the setting is completed, a step S504 is executed. In the step S504, the HBS 12 is operated in the LDM during the LDM duration. In step S505, the HBS 12 determines whether the LDM duration is ended. If the HBS 12 determines that the LDM duration is ended, a step S506 is executed, and if the HBS 12 determines that the LDM duration is not ended, a step S508 is executed. The steps S505 and S506 are non-necessary steps. In another exemplary embodiment, the HBS 12 may not end the LDM. In the step S506, the HBS 12 ends the LDM, and is continually operated in the normal mode.

In the step S508, the HBS 12 determines whether the IM request is received during the activating period. If the HBS 12 receives the IM request during the activating period, a step S507 is executed, and if the HBS 12 does not receive the IM request during the activating period, the step S504 is executed, so that the HBS 12 is continually operated in the LDM using the previous LDM setting. In the step S507, the HBS 12 determines whether or not the LDM setting is required to be adjusted. If the HBS 12 determines that the LDM setting is required to be adjusted, the step S503 is executed, by which the LDM setting is adjusted, and after the step S503, the step S504 is executed, so that the HBS 12 is operated in the LDM using the new LDM setting. If the HBS 12 determines that the LDM setting is not required to be adjusted, the step S504 is executed, so that the HBS 12 is continually operated in the LDM using the previous LDM setting.

Generally, if the HBS 12 still receives the IM request during the activating period, it represents that the mutual interference is not effectively mitigated, so that the HBS 12 increases a ratio of the deactivating period, so as to mitigate the signal interference. However, in case that the mutual interference is not effectively mitigated is not considered, the steps S507 and S508 could be removed form the signal interference handling method. In overall, in the exemplary embodiment of FIG. 5, the steps S502, S505-S508 are non-necessary steps.

Figure 6:
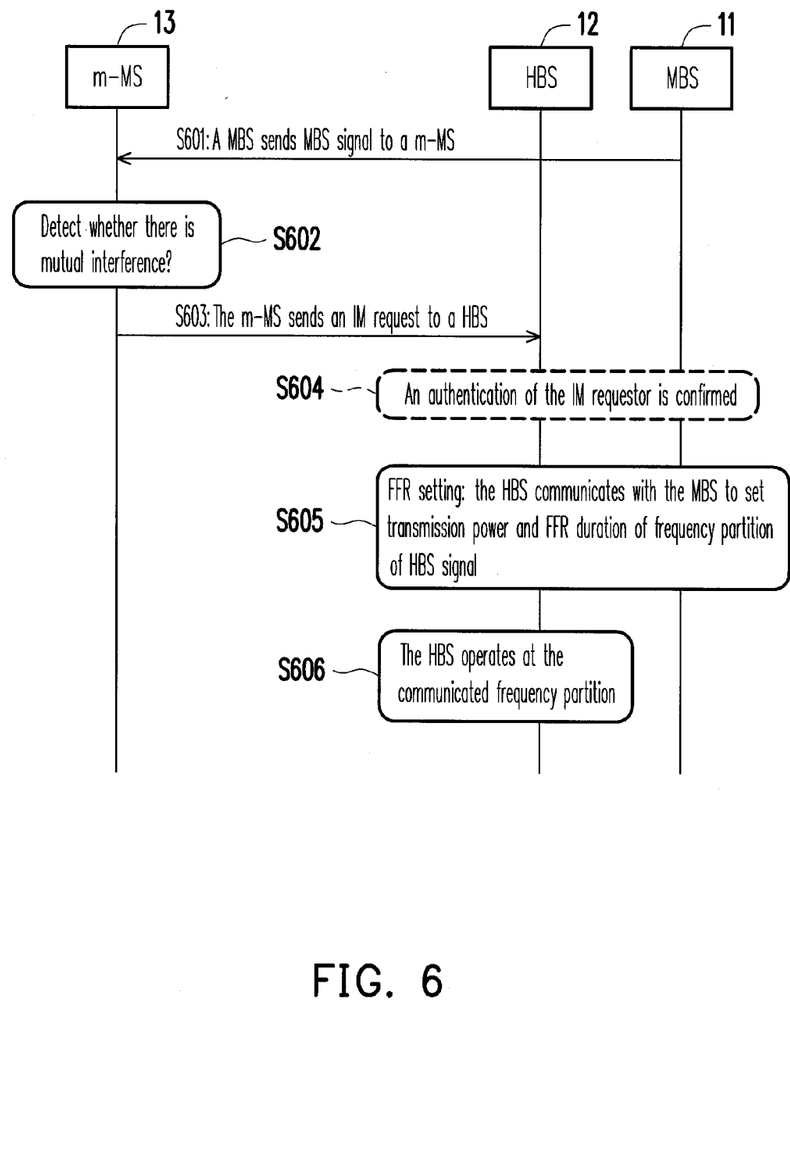
FIG. 6 is a flowchart of a signal interference handling method according to an exemplary embodiment of the disclosure.

Referring to FIG. 6, FIG. 6 is a flowchart of a signal interference handling method according to an exemplary embodiment of the disclosure, in which the step marked by dot lines is a non-necessary step. Steps S601-S604 are identical to the steps S201-S204 of FIG. 2, so that detailed descriptions thereof are not repeated, where the step S604 is also a non-necessary step of the signal interference handling method. In step S605, the HBS 12 communicates with the MBS 11, and sets transmission power and a fractional frequency reuse (FFR) duration of a frequency partition of the HBS signal in a FFR setting, the FFR refers to that the BS further divides its applicable frequency band, and the divided small frequency bands could be repeatedly used in different communication ranges according to communication demands, environments, conditions and settings, or could be shared by other BSs. Therefore, the frequency used by the HBS 12 for transmitting the HBS signal could be different to a frequency of the MBS signal. Then, in step S606, the HBS 12 is operated at a communicated frequency partition during the FFR duration, i.e., the HBS 12 uses the frequency and the transmission power of a frequency partition result to transmit the HBS signal.

Figure 7:
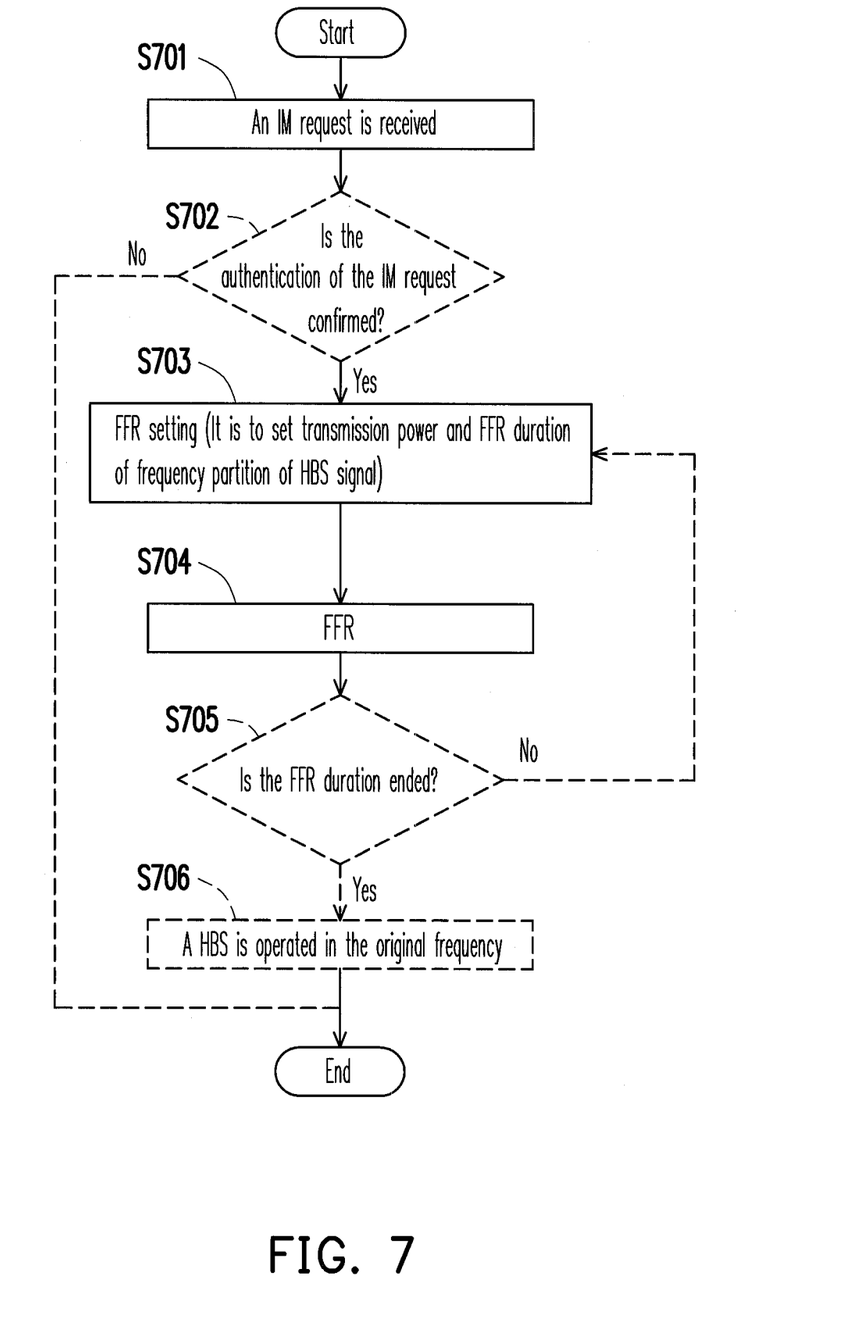
FIG. 7 is a flowchart of a signal interference handling method provided by an exemplary embodiment of the disclosure executed on a home base station (HBS).

Referring to FIG. 7, FIG. 7 is a flowchart of the signal interference handling method provided by the exemplary embodiment of the disclosure executed on the HBS, in which the steps marked by dot lines are non-necessary steps, and if the non-necessary determination-type steps are not executed, determination results thereof could be determined according to system predetermined values. Steps S701 and S702 are identical to the steps S501 and S502 of FIG. 5, so that detailed descriptions thereof are not repeated, where the step S702 is also a non-necessary step of the signal interference handling method. In step S703, the HBS 12 communicates with the MBS 11, and sets the transmission power and the FFR duration of the frequency partition of the HBS signal in the FFR setting. Then, in step S704, the HBS is operated at the communicated frequency partition during the FFR duration, i.e., the HBS 12 uses the frequency and the transmission power of the frequency partition result to transmit the HBS signal.

Then, in step S705, the HBS 12 detects whether the FFR duration is ended. If the FFR duration is ended, a step S706 is executed, and in the step S706, the HBS 12 is operated in an original frequency (a frequency used before the FFR setting is set or a default frequency), and uses the original frequency to transmit the HBS signal. If the FFR duration is not ended according to the step S705, it is to return to the step S703, and each time before the HBS signal is transmitted, the frequency partition, the transmission power and the FFR duration of the FFR setting are set first.

Figure 8:
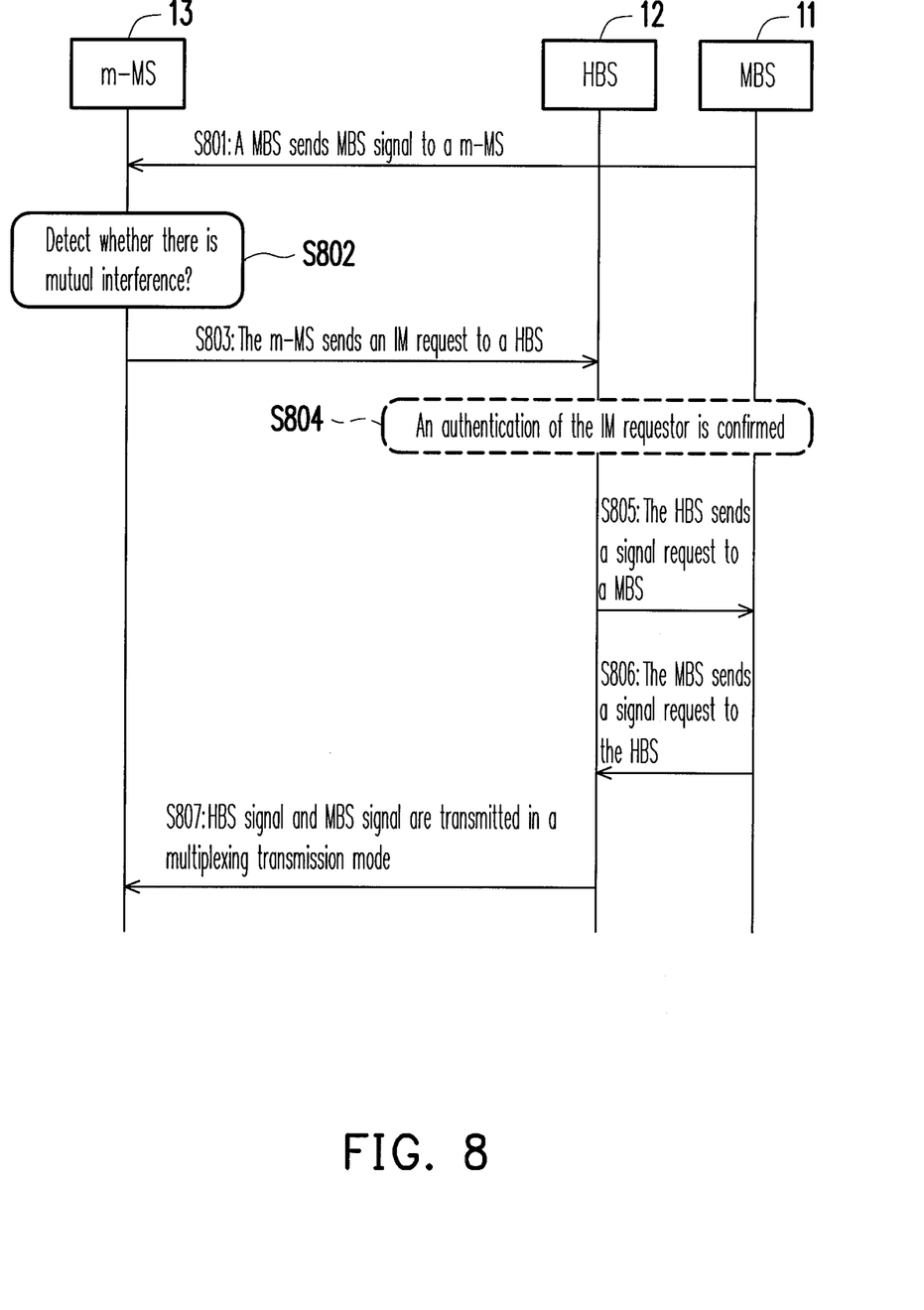
FIG. 8 is a flowchart of a signal interference handling method according to an exemplary embodiment of the disclosure.

Referring to FIG. 8, FIG. 8 is a flowchart of a signal interference handling method according to an exemplary embodiment of the disclosure, in which the step marked by dot lines is a non-necessary step. Steps S801-S804 are identical to the steps S201-S204 of FIG. 2, so that detailed descriptions thereof are not repeated, where the step S804 is also a non-necessary step of the signal interference handling method. In step S805, the HBS 12 sends a signal request to the MBS 11. In step S806, after the MBS 11 receives the signal request, the MBS 11 sends the MBS signal to the HBS 12. In step S807, the HBS 12 transmits the HBS signal and the MBS signal to the m-MS 13 in a multiplexing transmission mode, where the multiplexing transmission mode is to perform different channel encoding to the MBS signal and the HBS signal, and add the encoded MBS signal and the HBS signal for transmitting to the m-MS 13. In other words, the HBS 12 forwards the MBS signal to the m-MS 13. The MBS signal and the HBS signal could be respectively added with a weight thereof, and then the two signals are added to obtain a weighted adding result. If the weights of the two signals are both a unit weight (for example, the weight is equal to 1), a non-weighted adding result is obtained.

Figure 9:
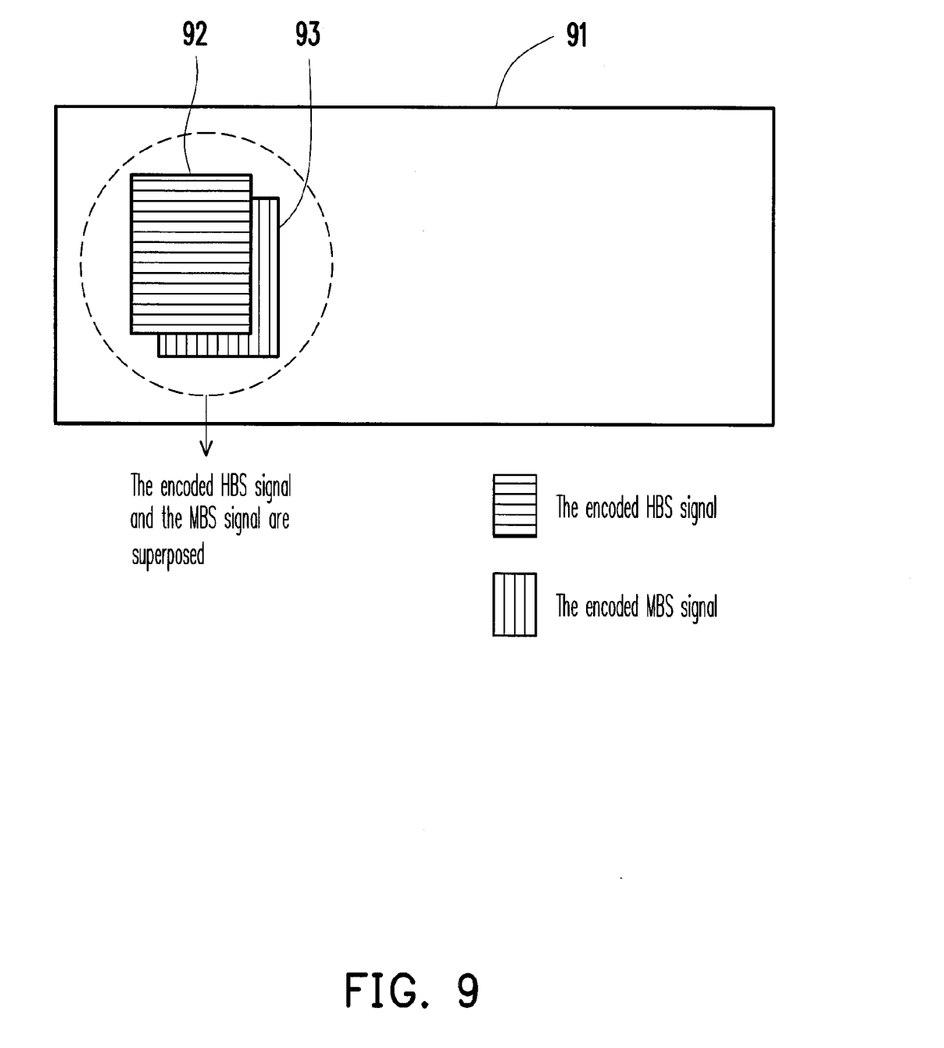
FIG. 9 is a schematic diagram of a HBS transmission frame according to an exemplary embodiment of the disclosure.

Referring to FIG. 9, FIG. 9 is a schematic diagram of a HBS transmission frame according to an exemplary embodiment of the disclosure. In FIG. 9, a HBS frame 91 transmitted by the HBS 12 includes encoded HBS signal 92 and encoded MBS signal 93. The encoded HBS signal 92 and the encoded MBS signal 93 are superposed and transmitted to the m-MS 13. The superposition of multiple encoded signals could be achieved by adding them together, which is also a method of signal multiplexing. Since the channel encodings used in the encoded HBS signal 92 and the encoded MBS signal 93 are different, the m-MS 13 could successfully decode and differentiate the MBS signal from the superposed signal according to the channel encoding used in the encoded MBS signal 93.

Figure 10:
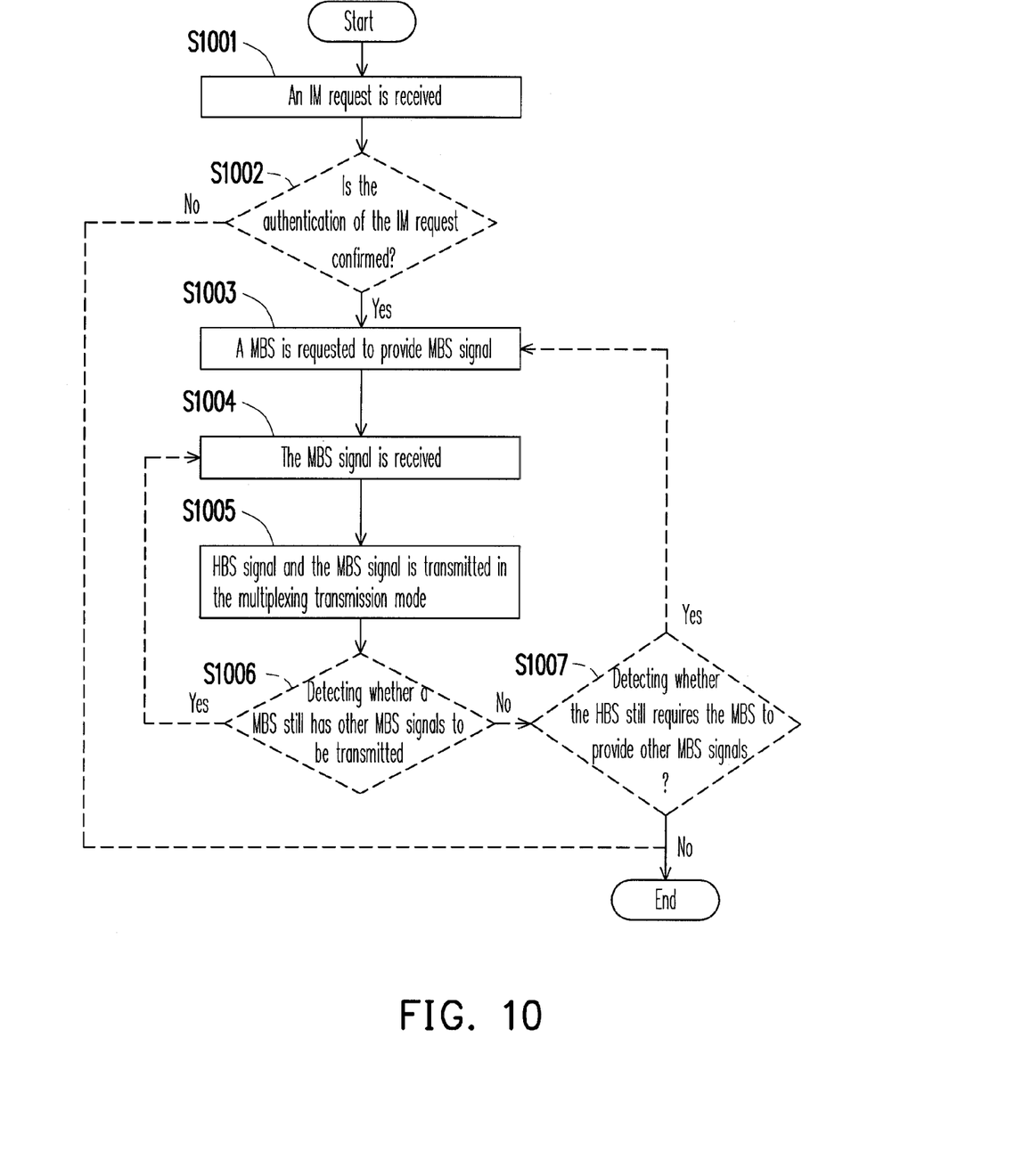
FIG. 10 is a flowchart of a signal interference handling method provided by an exemplary embodiment of the disclosure executed on a home base station (HBS).

Referring to FIG. 10, FIG. 10 is a flowchart of a signal interference handling method provided by the exemplary embodiment of the disclosure executed on the HBS, in which the steps marked by dot lines are non-necessary steps, and if the non-necessary determination-type steps are not executed, determination results thereof could be determined according to system predetermined values. Steps S1001 and S1002 are identical to the steps S501 and S502 of FIG. 5, so that detailed descriptions thereof are not repeated, where the step S1002 is also a non-necessary step of the signal interference handling method. In step S1003, the HBS 12 requests the MBS 11 to provide the MBS signal. In step S1004, the HBS 12 receives the MBS signal. In step S1005, the HBS 12 transmits the HBS signal and the MBS signal to the m-MS 13 in the multiplexing transmission mode.

In step S1006, the HBS 12 detects whether the MBS 11 has to provide other MBS signal to be transmitted. If the MBS 11 has to provide other MBS signal to be transmitted, the step S1004 is returned, and the HBS 12 receives the other MBS signal. If the MBS 11 does not have to provide other MBS signal to be transmitted, a step S1007 is executed. In the step S1007, it is detected whether the HBS 12 still requires the MBS 11 to provide other MBS signal. If the HBS 12 still requires the MBS to provide the other MBS signal, then it is return to the step S1003, by which the HBS 12 continually requests the MBS 11 to provide the MBS signal. If the HBS 12 does not require the MBS 11 to provide the other MBS signals, the signal interference handling method is ended. The steps 1006 and 1007 are non-necessary steps, which could be removed in other exemplary embodiments.

Figure 11:
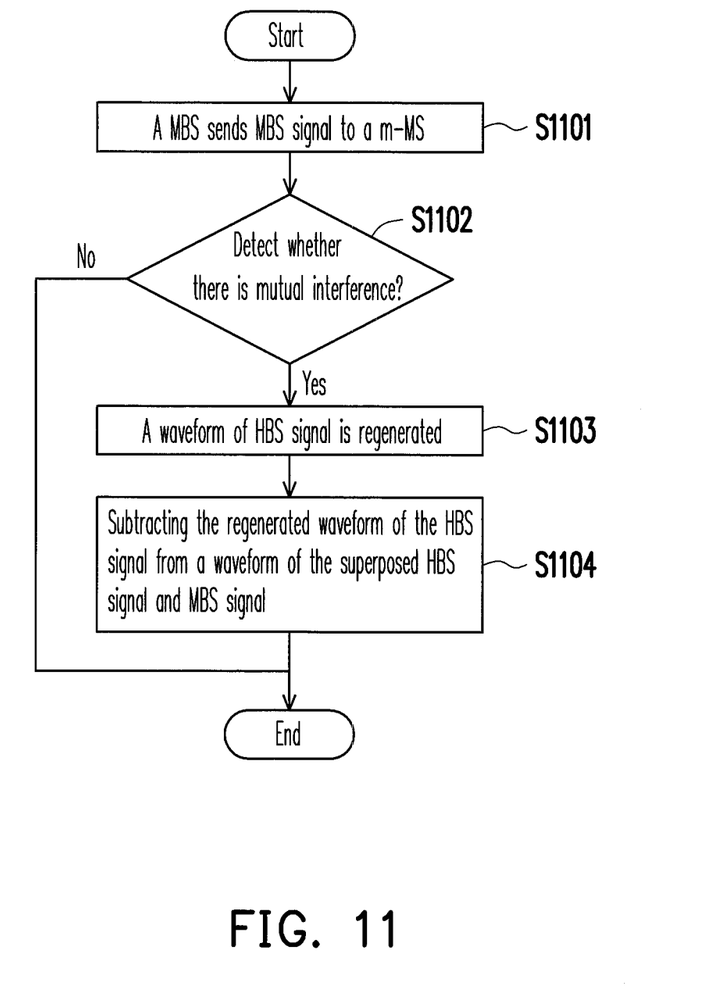
FIG. 11 is a flowchart of a signal interference handling method provided by an exemplary embodiment of the disclosure executed on a m-MS.

Referring to FIG. 11, FIG. 11 is a flowchart of the signal interference handling method provided by the exemplary embodiment of the disclosure executed on the m-MS. Steps S1101 and S1102 are identical to the steps S401 and S402 of FIG. 4, so that detailed descriptions thereof are not repeated. In step S1103, the m-MS 13 regenerates a waveform of the HBS signal. In step S1104, the m-MS 13 subtracts the regenerated waveform of the HBS signal from a superposed waveform of the HBS signal and the MBS signal, so as to eliminate the interference of the HBS signal to the MBS signal.

In summary, the exemplary embodiments of the disclosure provide a plurality of the signal interference handling methods for mitigating or handling the interference of the HBS signal to the MBS signal, and a system, a HBS and a MS using the same. According to the signal interference handling methods, the m-MS closed to the HBS could correctly receive the MBS signal.

It will be apparent to those skilled in the art that various modifications and variations could be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A signal interference handling method, adapted to a cellular system, wherein the cellular system comprises a macro/micro cell base station (MBS), a home base station (HBS), and a MBS-served mobile station (m-MS), the signal interference handling method comprising:
   detecting, at the m-MS, whether there is mutual interference;
   sending, at the m-MS, an interference mitigation (IM) request to the HBS when there is mutual interference; and
   the HBS entering a low duty mode (LDM) after the HBS receives the IM request;
   before the HBS enters the LDM, the HBS setting an activating-deactivating pattern and a LDM duration of a LDM setting, wherein the LDM duration is an operation time of the LDM, and the LDM activating-deactivating pattern represents an interlaced distribution of activating periods and deactivating periods in the LDM duration;
   detecting, at the HBS, whether the LDM duration is ended;
   the HBS returning to a normal mode or continually operating in the LDM when the LDM duration is ended;
   detecting, at the HBS, whether the IM request is received during the activating period when the LDM is not ended;
   the HBS continually operating in the LDM when the HBS does not receive IM request during the activating period;
   detecting, at the HBS, whether the LDM setting is required to be adjusted when the HBS receives IM request during the activating period; and
   when the LDM setting is required to be adjusted, the HBS reconfiguring the activating-deactivating pattern and the LDM duration, and entering the LDM with the latest LDM setting after the reconfiguration.

2. The signal interference handling method as claimed in claim 1, further comprising:
   the MBS serving the m-MS through an extending relay station of the MBS.

3. The signal interference handling method as claimed in claim 1, further comprising:
   confirming, at the HBS, an authentication of the m-MS from the MBS after the HBS receives the IM request; and
   the HBS entering the LDM when the HBS successfully confirms the authentication of the m-MS.

4. The signal interference handling method as claimed in claim 3, wherein the step of confirming the authentication of the m-MS comprises:
   sending, at the HBS, a m-MS identification and an authentication message to the MBS; and
   sending, at the MBS, a confirmation message or a rejection message to the HBS according to the m-MS identification and the authentication message.

5. The signal interference handling method as claimed in claim 4, wherein the IM request comprises the m-MS identification and the authentication message.

6. The signal interference handling method as claimed in claim 1, wherein the HBS continually operates in the LDM by using the same LDM setting when the LDM duration is ended.

7. The signal interference handling method as claimed in claim 1, wherein the HBS continually operates in the LDM by using a different LDM setting when the LDM duration is ended.

8. The signal interference handling method as claimed in claim 1, wherein the cellular system is an IEEE 802.16m and WiMAX system, the IM request is an advanced air interface ranging request (AAI-RNG-REQ) message with an indication of femto interference mitigation, and the HBS enters the LDM after receiving the AAI-RNG-REQ.

9. The signal interference handling method as claimed in claim 8, wherein the activating period is an available interval (AI), and the deactivating period is an unavailable interval (UAI), and when the HBS enters the LDM, the HBS operates in a normal mode during the AI, and the HBS does not transmit any signal to an air interface during the UAI.

10. The signal interference handling method as claimed in claim 9, wherein the HBS transmits a message carrying LDM parameter configuration information to a member MS of the HBS within its coverage range during the AI, so that the MS obtains an interlaced distribution of the AI and the UAI in the LDM duration.

11. The signal interference handling method as claimed in claim 1, wherein the HBS first determines whether there is any serving mobile station (MS) within a coverage range of the HBS after the HBS receives the IM request, wherein the HBS enters the LDM when there is no serving MS and there is no MS performing network entry or re-entry within its coverage range.

12. A signal interference handling method, adapted to a HBS of a cellular system, the signal interference handling method comprising:
   the HBS entering a LDM after the HBS receives an IM request, wherein the IM request is sent by a m-MS of the cellular system when the m-MS detects there is mutual interference;
   setting, the HBS, an activating-deactivating pattern and a LDM duration of a LDM setting before the HBS enters the LDM, wherein the LDM duration is an operation time of the LDM, and the LDM activating-deactivating pattern represents an interlaced distribution of activating periods and deactivating periods in the LDM duration;
   detecting, at the HBS, whether the LDM duration is ended;
   the HBS returning to a normal mode or continually operating in the LDM when the LDM duration is ended;
   detecting, the HBS, whether the IM request is received during the activating period when the LDM is not ended;

the HBS continually operating in the LDM when the HBS does not receive IM request during the activating period;

detecting, at the HBS, whether the LDM setting is required to be adjusted when the HBS receives IM request during the activating period; and reconfiguring, at the HBS, the activating-deactivating pattern and the LDM duration, and entering the LDM with the latest LDM setting after the reconfiguration when the LDM setting is required to be adjusted.

13. The signal interference handling method as claimed in claim 12, further comprising:

confirming, at the HBS, an authentication of the m-MS from a MBS after the HBS receives the IM request; and the HBS entering the LDM when the HBS successfully confirms the authentication of the m-MS.

14. The signal interference handling method as claimed in claim 13, wherein the step of confirming the authentication of the m-MS comprises:

sending, at the HBS, a m-MS identification and an authentication message to the MBS; and sending, at the MBS, a confirmation message or a rejection message to the HBS according to the m-MS identification and the authentication message.

15. The signal interference handling method as claimed in claim 14, wherein the IM request comprises the m-MS identification and the authentication message.

16. The signal interference handling method as claimed in claim 12, wherein the HBS continually operates in the LDM by using the same LDM setting when the LDM duration is ended.

17. The signal interference handling method as claimed in claim 12, wherein the HBS continually operates in the LDM by using a different LDM settings when the LDM duration is ended.

18. The signal interference handling method as claimed in claim 12, wherein the cellular system is an IEEE 802.16m and WiMAX system, the IM request is an advanced air interface ranging request (AAI-RNG-REQ) message with an indication of femto interference mitigation, and the HBS enters the LDM after receiving the AAI-RNG-REQ.

19. The signal interference handling method as claimed in claim 18, wherein the activating period is an available interval (AI), and the deactivating period is an unavailable interval (UAI), and when the HBS enters the LDM, the HBS operates in a normal mode during the AI, and the HBS does not transmit any signal to an air interface during the UAI.

20. The signal interference handling method as claimed in claim 19, wherein the HBS transmits a message carrying LDM parameter configuration information to a member MS of the HBS within its coverage range during the AI, so that the MS obtains an interlaced distribution of the AI and the UAI in the LDM duration.

21. The signal interference handling method as claimed in claim 12, wherein the HBS first determines whether there is any serving mobile station (MS) within a coverage range of the HBS after the HBS receives the IM request, wherein the HBS enters the LDM when there is no serving MS and there is no MS performing network entry or re-entry within its coverage range.

22. A cellular wireless communication system, adapted to handle signal interference, the cellular wireless communication system comprising:

a macro/micro cell base station (MBS);

a home base station (HBS); and a MBS-served mobile station (m-MS), wherein the m-MS detects whether there is mutual interference, wherein the m-MS sends an interference mitigation (IM) request to the HBS when there is mutual interference; and the HBS enters a low duty mode (LDM) after the HBS receives the IM request;

setting, the HBS, an activating-deactivating pattern and a LDM duration of a LDM setting before the HBS enters the LDM, wherein the LDM duration is an operation time of the LDM, and the LDM activating-deactivating pattern represents an interlaced distribution of activating periods and deactivating periods in the LDM duration;

detecting, at the HBS, whether the LDM duration is ended;

the HBS returning to a normal mode or continually operating in the LDM when the LDM duration is ended;

detecting, the HBS, whether the IM request is received during the activating period when the LDM is not ended;

the HBS continually operating in the LDM when the HBS does not receive IM request during the activating period;

detecting, at the HBS, whether the LDM setting is required to be adjusted when the HBS receives IM request during the activating period; and reconfiguring, at the HBS, the activating-deactivating pattern and the LDM duration, and entering the LDM with the latest LDM setting after the reconfiguration when the LDM setting is required to be adjusted.

23. The cellular wireless communication system as claimed in claim 22, wherein the HBS confirms an authentication of the m-MS from the MBS after the HBS receives the IM request; and the HBS enters the LDM when the HBS successfully confirms the authentication of the m-MS.

24. The cellular wireless communication system as claimed in claim 22, wherein the HBS first determines whether there is any serving mobile station (MS) within a coverage range of the HBS after the HBS receives the IM request, wherein the HBS enters the LDM when there is no serving MS and there is no MS performing network entry or re-entry within its coverage range.

25. A home base station (HBS), adapted to handle signal interference, and comprising a transmitter and a receiver for transmitting and receiving data and a processor coupled to the transmitter and the receiver and is configured for:

entering a low duty mode (LDM) after the HBS receives an interference mitigation (IM) request, wherein the IM request is sent by a macro/micro cell base station (MBS)-served mobile station (m-MS) when the m-MS detects there is mutual interference;

setting an activating-deactivating pattern and a LDM duration of a LDM setting before the HBS enters the LDM, wherein the LDM duration is an operation time of the LDM, and the LDM activating-deactivating pattern represents an interlaced distribution of activating periods and deactivating periods in the LDM duration;

detecting whether the LDM duration is ended;

returning to a normal mode or continually operating in the LDM when the LDM duration is ended;

detecting whether the IM request is received during the activating period when the LDM is not ended;

continually operating in the LDM when the HBS does not receive IM request during the activating period;

detecting whether the LDM setting is required to be adjusted when the HBS receives IM request during the activating period; and reconfiguring the activating-deactivating pattern and the LDM duration, and entering the LDM with the latest LDM setting after the reconfiguration when the LDM setting is required to be adjusted.

26. The HBS as claimed in claim 25, wherein,
the HBS confirms an authentication of the m-MS from the MBS after the HBS receives the IM request; and
the HBS enters the LDM when the HBS successfully confirms the authentication of the m-MS.

* * * * *